US008570382B2

(12) United States Patent
Kashihara

(10) Patent No.: US 8,570,382 B2
(45) Date of Patent: Oct. 29, 2013

(54) ELECTRONIC DEVICE, ELECTRONIC DEVICE SYSTEM, AND IMAGE PROCESSING METHOD

(75) Inventor: Mitsuru Kashihara, Osaka (JP)

(73) Assignee: Panasonic Corporation, Osaka (JP)

( * ) Notice: Subject to any disclaimer, the term of this patent is extended or adjusted under 35 U.S.C. 154(b) by 249 days.

(21) Appl. No.: 13/177,759

(22) Filed: Jul. 7, 2011

(65) Prior Publication Data

US 2012/0044377 A1 Feb. 23, 2012

(30) Foreign Application Priority Data

Aug. 17, 2010 (JP) ................................ 2010-182041
Feb. 24, 2011 (JP) ................................ 2011-37869

(51) Int. Cl.
*H04N 5/225* (2006.01)
*H04N 5/232* (2006.01)
*H04N 5/228* (2006.01)
*H04N 5/76* (2006.01)

(52) U.S. Cl.
USPC ................ 348/207.1; 348/207.2; 348/211.99; 348/211.14; 348/222.1; 348/231.2

(58) Field of Classification Search
USPC ........................... 348/14.01–14.16, 143–160, 348/207.99–207.2, 211.99–211.14, 222.1, 348/231.99–231.9, 333.01–333.13; 382/162–172, 232–254; 707/609–686, 707/705–788, 821–831
See application file for complete search history.

(56) References Cited

U.S. PATENT DOCUMENTS

| 6,535,243 B1 * | 3/2003 | Tullis .......................... 348/207.1 |
| 6,715,003 B1 * | 3/2004 | Safai ............................... 710/33 |
| 7,391,432 B2 | 6/2008 | Terada |
| 7,463,216 B2 * | 12/2008 | Yamazaki et al. ............. 345/2.3 |
| 7,643,065 B2 * | 1/2010 | Mikawa ................... 348/211.99 |
| 7,671,906 B2 * | 3/2010 | Satoh ...................... 348/231.99 |
| 7,748,049 B2 * | 6/2010 | Steinberg ......................... 726/31 |
| 2002/0101515 A1 * | 8/2002 | Yoshida et al. ............... 348/211 |
| 2002/0109770 A1 | 8/2002 | Terada |
| 2003/0059202 A1 * | 3/2003 | Yoda ............................... 386/69 |
| 2004/0165083 A1 * | 8/2004 | Chang ........................ 348/222.1 |
| 2005/0134689 A1 * | 6/2005 | Hatanaka ................... 348/207.1 |
| 2005/0146621 A1 * | 7/2005 | Tanaka et al. .............. 348/211.2 |
| 2005/0162524 A1 * | 7/2005 | Koshikawa .............. 348/211.99 |
| 2006/0279636 A1 * | 12/2006 | Sasaki ....................... 348/207.2 |
| 2006/0279642 A1 * | 12/2006 | Yoneda ..................... 348/231.1 |

(Continued)

FOREIGN PATENT DOCUMENTS

JP 2002-238040 8/2002

*Primary Examiner* — Michael Osinski
(74) *Attorney, Agent, or Firm* — Wenderoth, Lind & Ponack, L.L.P.

(57) ABSTRACT

An electronic device includes: a reading unit reading image data; a transmitting unit transmitting the image data to another electronic device via a telecommunications line upon receiving a user operation; a first image processing unit processing the image data; and a control unit (i) causing, in the case where a second image processing unit has a connection to the control unit, the second image processing unit to process the image data, and the transmitting unit to transmit the processed image data, and (ii) causing, in the case where id the second image processing unit does not have a connection to the control unit, the first image processing unit to process the image data, and the transmitting unit to transmit the processed image data, the second image processing unit being included in the movie camera and processing, as well as the image data, image data which is obtained by the movie camera.

7 Claims, 6 Drawing Sheets

(56) References Cited

U.S. PATENT DOCUMENTS

| | | | |
|---|---|---|---|
| 2006/0288387 A1* | 12/2006 | Asai | 725/78 |
| 2007/0028009 A1* | 2/2007 | Robbin et al. | 710/16 |
| 2008/0043110 A1* | 2/2008 | Aizawa | 348/211.2 |
| 2008/0106604 A1* | 5/2008 | Kojima | 348/207.2 |
| 2009/0040331 A1* | 2/2009 | Kitagawa | 348/222.1 |
| 2009/0167871 A1* | 7/2009 | Usui | 348/207.1 |
| 2009/0207283 A1* | 8/2009 | Nakai et al. | 348/240.99 |
| 2010/0138572 A1* | 6/2010 | Rofougaran | 710/106 |
| 2011/0038595 A1* | 2/2011 | Kimoto et al. | 386/230 |
| 2011/0074962 A1* | 3/2011 | Takanezawa | 348/207.1 |
| 2011/0176008 A1* | 7/2011 | Fujitani | 348/207.1 |
| 2011/0187873 A1* | 8/2011 | Fujitsuka | 348/207.1 |

* cited by examiner

ELECTRONIC DEVICE, ELECTRONIC DEVICE SYSTEM, AND IMAGE PROCESSING METHOD

BACKGROUND OF THE INVENTION (1) Field of the Invention

The present invention relates to electronic devices and, more particularly, to an electronic device which can connect to an imaging device, and can process and transmit image data.

(2) Description of the Related Art

There is a conventional technique for constructing a video conference system. In the system, two or more personal computers (PC) connect each other via the Internet, and each PC connects to a digital video camera.

A PC disclosed in Patent Reference 1 (Japanese Patent Application Publication No. 2002-238040) stores a program for video conference. Upon detecting the connection to a digital camera and the establishment of a two-way communication with the digital camera, the PC automatically boots up the video conference program. Then, on PC displays at both parties, the PCs provide the moving pictures obtained by the digital cameras for communicating at both sides. Hence the PC disclosed in Patent Reference 1 frees users from complex operations of the PC, and allows the users to easily participate in a video conference.

SUMMARY OF THE INVENTION

When a user desires to transmit a large amount of image data, such as full high-definition moving image data, to communicating another party, the image data needs processing so as to conform to a format suitable for the transmission.

Consider, however, a conventional electronic device which executes processing on a general-purpose arithmetic processing unit using software; such an electronic device suffers a heavy load in processing a large amount of image data. Due to this problem, the conventional electronic device has to bear excessive time for processing the image data, and thus is not useful for the users.

The present invention is conceived in view of the above problem and has as an object to introduce an electronic device which can reduce a processing load on image data to be transmitted.

In order to solve the above problem, an electronic device according to an aspect of the present invention is connectible to an imaging device. The electronic device includes the following: a reading unit which reads image data; a transmitting unit which transmits the image data read by the reading unit to another electronic device via a telecommunications line upon receiving a user operation; a first image processing unit which process the image data read by the reading unit; and a control unit which (i) causes, in the case where a second image processing unit has a connection to the control unit, the second image processing unit to process the image data, and the transmitting unit to transmit the processed image data, and (ii) causes, in the case where the second image processing unit does not have a connection to the control unit, the first image processing unit to process the image data, and the transmitting unit to transmit the processed image data, the second image processing unit being included in the imaging device and processing, as well as the image data, image data which is obtained by the imaging device.

In the above structure, when the second image processing unit included in the imaging device has a connection to the control unit, the control unit causes the second image processing unit to process image data. When the second image processing unit does not have a connection to the control unit, the control unit causes the first image processing unit to process the image data. Here when a communications service via a telecommunications line, such as a video conference, is available, the electronic device is used in having a connection to the imaging device. Hence the control unit in the electronic device connects to the second image processing unit in the imaging device. This structure allows the second image processing unit to process an image, which contributes to a lower processing load on the first image processing unit.

When the transmitting unit does not transmit the image data read by the reading unit, the control unit preferably causes the transmitting unit to transmit the image data which is obtained by the imaging device and processed by the second image processing unit.

In the above structure, when the transmitting unit does not transmit the image data read by the reading unit, the control unit causes the transmitting unit to transmit image data obtained by the imaging device and processed by the second image processing unit. This structure allows smooth transmission of the image data obtained by the imaging device and the image data read by the reading unit.

Instead of being introduced as the electronic device, the present invention may be provided in a form of an electronic device system including the electronic device and the imaging device.

In an electronic device system according to another aspect of the present invention, the imaging device preferably includes, in addition, an imaging unit which captures an object. When the second image processing unit processes the image data read by the reading unit, the second image processing unit may transmit the processed image data to the control unit. When the second image processing unit does not process the image data read by the reading unit, the second image processing unit is may process image data of the object captured by the imaging unit, and transmit the processed image data to the control unit.

In the above structure, when the second image processing unit processes the image data read by the reading unit, the second image processing unit processes the image. When second image processing unit does not process the image data read by the reading unit, the second image processing unit processes image data obtained by the imaging unit. In other words, a single second image processing unit can process both of the image data read by the reading unit and the image data obtained by the imaging unit. This structure contributes to reducing a processing load on the first image processing unit.

Moreover, the present invention may be introduced in a form of an image processing method which involves executing processes carried out by the processing units included in the electronic device as steps. Furthermore, the present invention may also be introduced in a form of a program product which, when loaded into a computer, causes the computer to execute the distinctive processes included in the method. As a matter of course, such a program product may be distributed via storage media including a compact disc read only memory (CD-ROM), and transmission media including the Internet. The present invention may as well be provided as an integrated circuit including the distinctive processing units included in the electronic device.

The present invention can introduce an electronic device which contributes to the reduction of a processing load on image data to be transmitted.

FURTHER INFORMATION ABOUT TECHNICAL BACKGROUND TO THIS APPLICATION

The disclosure of Japanese Patent Application Nos. 2010-182041 filed on Aug. 17, 2010 and 2011-37869 filed on Feb. 24, 2011 including specifications, drawings and claims is incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Embodiment 1

When a second arithmetic processing unit 122 capable of encoding processing is connected to a PC 100 according to Embodiment 1, the PC 100 has the second arithmetic processing unit 122 encode moving image data to be transmitted, and transmits the encoded moving image data. The second arithmetic processing unit 122 is included in a movie camera 120 which is externally connected to the PC 100. When a transmitter module 110 suspends the transmission of moving image data stored in a hard disk drive (HDD) 104, a first arithmetic processing unit 101 causes the transmitter module 110 to transmit moving image data obtained by the movie camera 120.

Hereinafter, a system structure and an operation of the PC 100 shall be detailed with reference to the drawings.

1. System Structure

Figure 1:
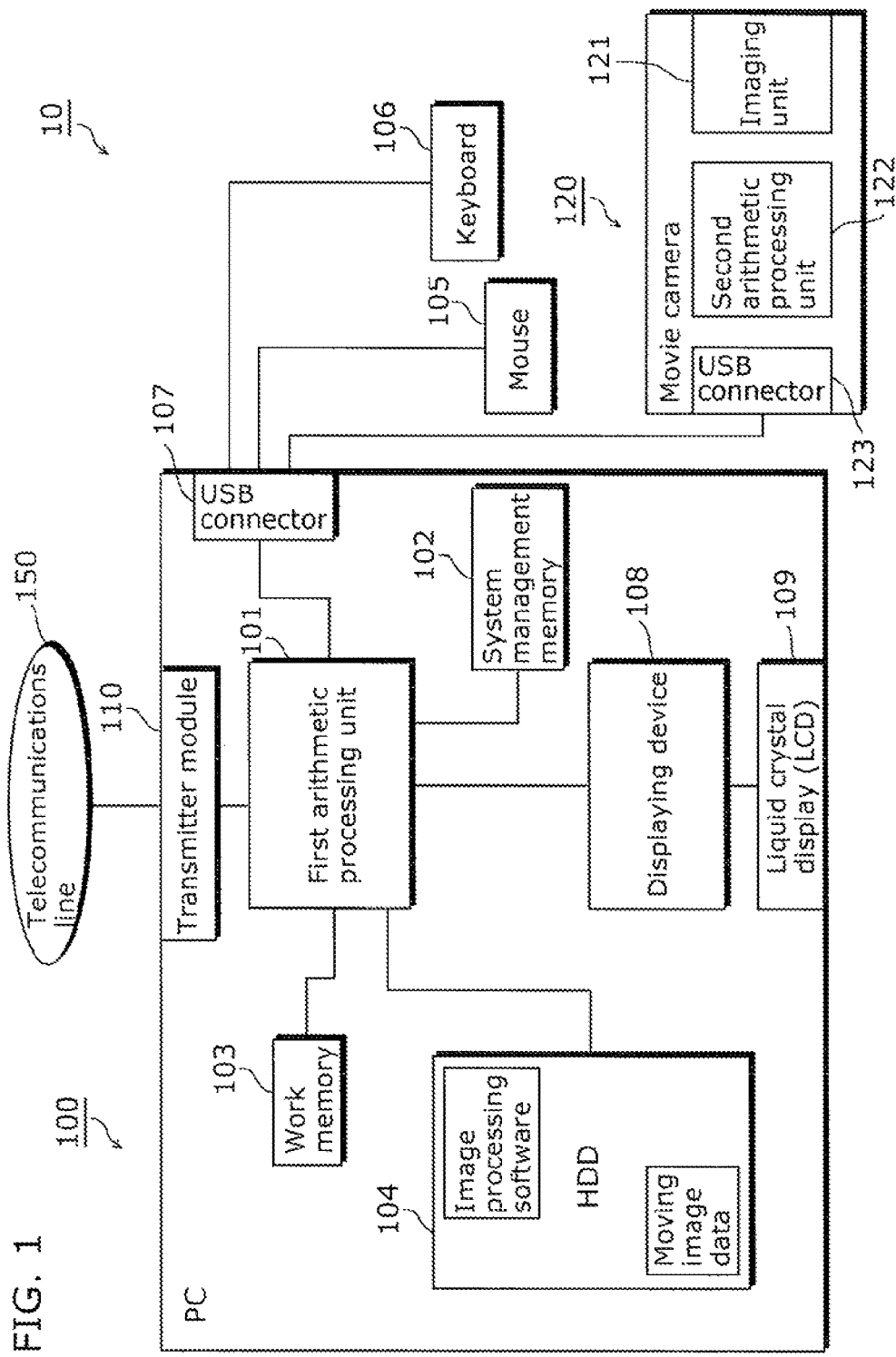
FIG. 1 shows an overall structure of an electronic device system including a PC according to Embodiment 1.

First, the system structure of the PC 100 shall be detailed with reference to FIG. 1. FIG. 1 shows an overall structure of an electronic device system 10 including the PC 100.

The PC 100 includes the first arithmetic processing unit 101, a system management memory 102, a work memory 103, the HDD 104, a mouse 105, a keyboard 106, a universal serial bus (USB) connector 107, a displaying device 108, an LCD 109, the transmitter module 110, and the movie camera 120.

The first arithmetic processing unit 101 executes a process in the PC 100. The first arithmetic processing unit 101 electrically connects to the system management memory 102, the work memory 103, the HDD 104, the USB connector 107, the displaying device 108, and the transmitter module 110.

Then, via the USB connector 107, the first arithmetic processing unit 101 receives information on a user's operation from as the mouse 105 or the keyboard 106. The first arithmetic processing unit 101 also reads the moving image data and image processing software both stored in the HDD 104.

Furthermore, the first arithmetic processing unit 101 can encode the read moving image data using the read image processing software. Here, the first arithmetic processing unit 101 is formed of a general-purpose electrical circuit in order to execute general-purpose functions. The first arithmetic processing unit 101 uses the read image processing software to encode the read moving picture.

Via the USB connector 107, the first arithmetic processing unit 101 is capable of transmitting and receiving moving image data to and from the movie camera 120. In addition, via the USB connector 107, the first arithmetic processing unit 101 transmits a control request signal to the movie camera 120, and receives a control answer signal from the movie camera 120.

Furthermore, via a telecommunications line (the Internet) 150, the first arithmetic processing unit 101 causes the transmitter module 110 to transmit the moving image data to another PC. Although not shown, the first arithmetic processing unit 101 has total control over a power system supplying powers to each of the units in the PC 100.

The system management memory 102 holds an operating system (OS).

The work memory 103 temporarily stores information which the first arithmetic processing unit 101 requires in order to execute various processing operations.

The HDD 104 is a high-capacity storage medium for storing moving image data. In addition, the HDD 104 stores an executable file for the image processing software. As described above, the moving image data or the image processing software stored in the HDD 104 is appropriately read by the first arithmetic processing unit 101.

The mouse 105 is a pointing device which the user operates. With the mouse 105, the user can select moving image data via the transmission screen provided on the LCD 109. Operating the mouse 105, the user can transmit to another PC the selected moving image data as data to be transmitted.

The keyboard 106 is a device through which the user enters characters. When transmitting the moving image data, the user adds characters to the moving image data as necessary.

The USB connector 107 connects the mouse 105, the keyboard 106, and the movie camera 120 to the PC 100.

The displaying device 108 visually-images screen information operated by the first arithmetic processing unit 101, and transmits the visually-imaged screen information to the LCD 109.

The LCD 109 displays the screen information visually-imaged by the displaying device 108.

The transmitter module 110 can transmit the moving image data received from the first arithmetic processing unit 101 to another PC via the telecommunications line 150. The transmitter module 110 may be introduced in a form of, for example, a wired Local Area Network (LAN) and a wireless LAN.

Next, a structure of the movie camera 120 shall be described with reference to FIG. 1. The movie camera 120 includes an imaging unit 121, the second arithmetic processing unit 122, and a USB connector 123.

The imaging unit 121 captures an object, and includes an optical system and an imaging sensor which are not shown. The imaging unit 121 can capture images on a real-time basis.

The second arithmetic processing unit 122 executes image processing, such as encoding processing, on the real-time images captured by the imaging unit 121. Then the second arithmetic processing unit 122 supplies the processed real-time images to the first arithmetic processing unit 101 via the USB connector 123.

Moreover, the second arithmetic processing unit 122 encodes the moving image data forwarded from the PC 100 via the USB connector 123. Then the second arithmetic processing unit 122 supplies the encoded moving image data to the first arithmetic processing unit 101 via the USB connector 123.

Here the second arithmetic processing unit 122 includes a dedicated electric circuit which specializes in image processing, and executes encoding processing using hardware. In other words, the second arithmetic processing unit 122 is superior to the first arithmetic processing unit 101 in capability of encoding processing provided on the moving image data since the second arithmetic processing unit 122 utilizes hardware instead of software which the first arithmetic processing unit 101 utilizes. Thus when the movie camera 120 is connected to the PC 100, the first arithmetic processing unit 101 becomes accessible to the second arithmetic processing unit 122. Accordingly, the first arithmetic processing unit 101 can cause the second arithmetic processing unit 122 to encode the moving image data.

Hence when the PC 100 connects to the movie camera 120, the PC 100 has the processing load with the moving image data reduced. Accordingly, the PC 100 can efficiently finish encoding processing the moving image data, and efficiently transmit the encoded moving image data to another PC.

Furthermore, the first arithmetic processing unit 101 is formed of a general-purpose electrical circuit. By reading software having a function which the user desires to execute, the first arithmetic processing unit 101 can execute processing other than encoding processing. In other words, the first arithmetic processing unit 101 executes transmission and reception processing and display processing as well as the encoding processing.

Hence when the first arithmetic processing unit 101 connects to the second arithmetic processing unit 122 having a circuit dedicated for encoding processing, the first arithmetic processing unit 101 causes the second arithmetic processing unit 122 to execute a job regarding the encoding processing so that the encoding processing load on the first arithmetic processing unit 101 reduces. Taking another processing to be executed in parallel into consideration, the PC 100 shows overall great efficiency in encoding the moving image data.

Furthermore, the second arithmetic processing unit 122 can specialize in image processing, such as encoding the moving image data and processing on captured real-time images. Thus, when the movie camera 120 including the second arithmetic processing unit 122 is connected to the PC 100, the first arithmetic processing unit 101 delegates the image processing to the second arithmetic processing unit 122, so that the first arithmetic processing unit 101 can concentrate on other processing such as the transmission processing. Thus when the PC 100 connects to the movie camera 120, the processing load on the PC 100 reduces. Taking another processing to be executed in parallel into consideration, the PC 100 shows overall great efficiency in encoding the moving image data.

The USB connector 123 connects the movie camera 120 to the PC 100. Here the USB connector 107 for the PC 100 is coupled to the USB connector 123 for the movie camera 120 via a USB cable. It is noted that the above connection technique is merely an example: in the present invention, the PC 100 and the movie camera 120 may be connected via another wired connection technique or a wireless connection technique.

Next, a functional structure of the PC 100 shall be described.

Figure 2:
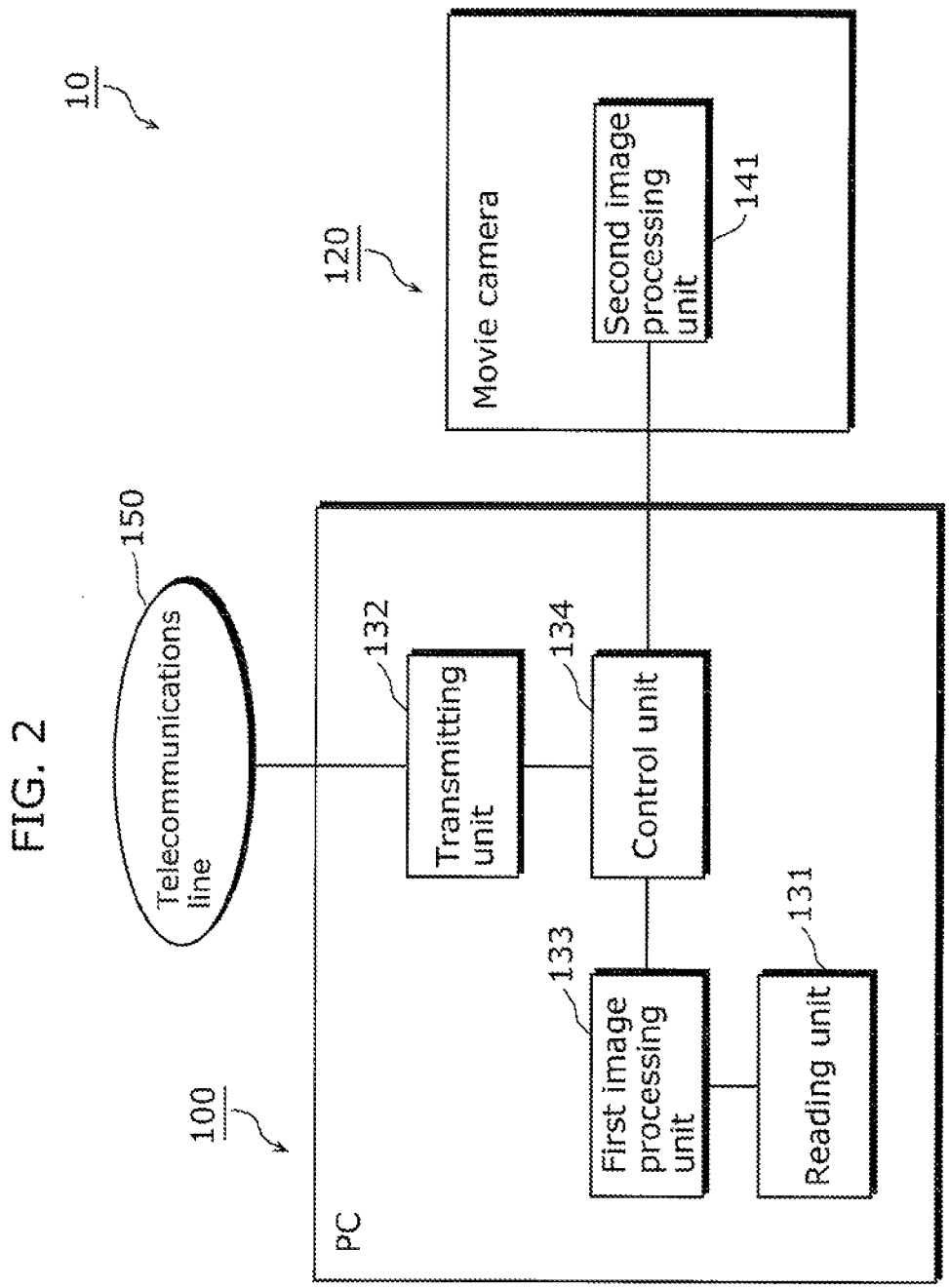
FIG. 2 is a block diagram showing a functional structure of the PC according to Embodiment 1.

FIG. 2 is a block diagram showing the functional structure of the PC 100 according to Embodiment 1.

As shown in FIG. 2, the PC 100 functionally includes a reading unit 131, a transmitting unit 132, a first image processing unit 133, and a control unit 134. The movie camera 120 includes a second image processing unit 141. The second image processing unit 141 processes image data obtained by the movie camera 120.

The reading unit 131 reads image data, such as moving image data, from the HDD 104.

According to an operation by the user, the transmitting unit 132 transmits the image data read from the reading unit 131 to another electronic device via the telecommunications line 150. Furthermore, the transmitting unit 132 also transmits to another electronic device image data which is captured by the movie camera 120 and processed by the second image processing unit 141. In other words, the transmitting unit 132 transmits to another electronic device (i) the image data provided from the first image processing unit 133, and (ii) the image data provided from the second image processing unit 141. It is noted that the transmitting unit 132 acts as the transmitter module 110.

The first image processing unit 133 executes image processing, such as encoding, on the image data read by the reading unit 131.

When the second image processing unit 141 has a connection to the control unit 134, the control unit 134 causes (i) the second image processing unit 141 to process the image data, and (ii) the transmitting unit 132 to transmit the processed image data.

When the second image processing unit 141 does not have a icy connection to the control unit 134, the control unit 134 causes (i) the first image processing unit 133 to process the image data, and (ii) the transmitting unit 132 to transmit the processed image data.

When the transmitting unit 132 does not transmit the image data read by the reading unit 131, the control unit 134 causes the transmitting unit 132 to transmit the image data obtained by the movie camera 120 and processed by the second image processing unit 141.

Here general-purpose electrical circuits in the first arithmetic processing unit 101 execute predetermined software to act as the reading unit 131, the first image processing unit 133, and the control unit 134.

In the case of processing the image data read by the reading unit 131, the second image processing unit 141 transmits to the control unit 134 the image data read by the reading unit 131 and processed. In the case of not processing the image data read by the reading unit 131, the second image processing unit 141 processes the image data obtained by the imaging unit 121 included in the movie camera 120, and transmits the processed image data to the control unit 134.

Here, a dedicated circuit, for encoding processing in the second arithmetic processing unit 122 acts as the second image processing unit 141.

Figure 3:
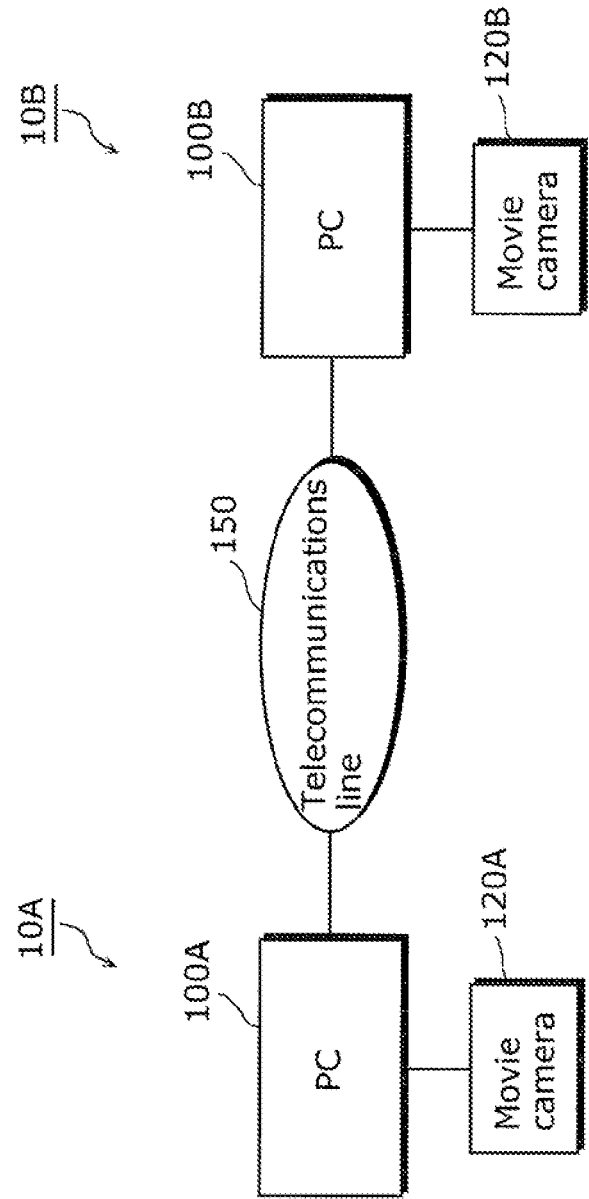
FIG. 3 shows a structure of a video conference system including electronic devices according to Embodiment 1.

FIG. 3 shows a structure of a video conference system including electronic devices 10A and 10B according to Embodiment 1. In other words, FIG. 2 illustrates how two PCs 100A and 100B are connected each other via the telecommunications line 150.

Here the PCs 100A and 100B and the above-described PC 100 share a similar structure. Moreover, the PCs 100A and 1008 respectively connect to movie cameras 120A and 120B. Furthermore, each of the PCs 100A and 100B connects to the telecommunications line 150 via its own transmitter module 110.

Accordingly, the PCs 100A and 100B start software which executes a communications service, and can make the communications service available via the telecommunications line 150. The details hereinafter assume that the PC 100 is set available in the communications service via another PC and the telecommunications line 150.

2. How Embodiment 1 Corresponds to an Implementation of the Present Invention The PC 100 exemplifies "electronic device" according to an implementation of the present invention. The movie camera 120 exemplifies "imaging device" according to the implementation of the present invention.

3. Transmission Screen Layout

Figure 4:
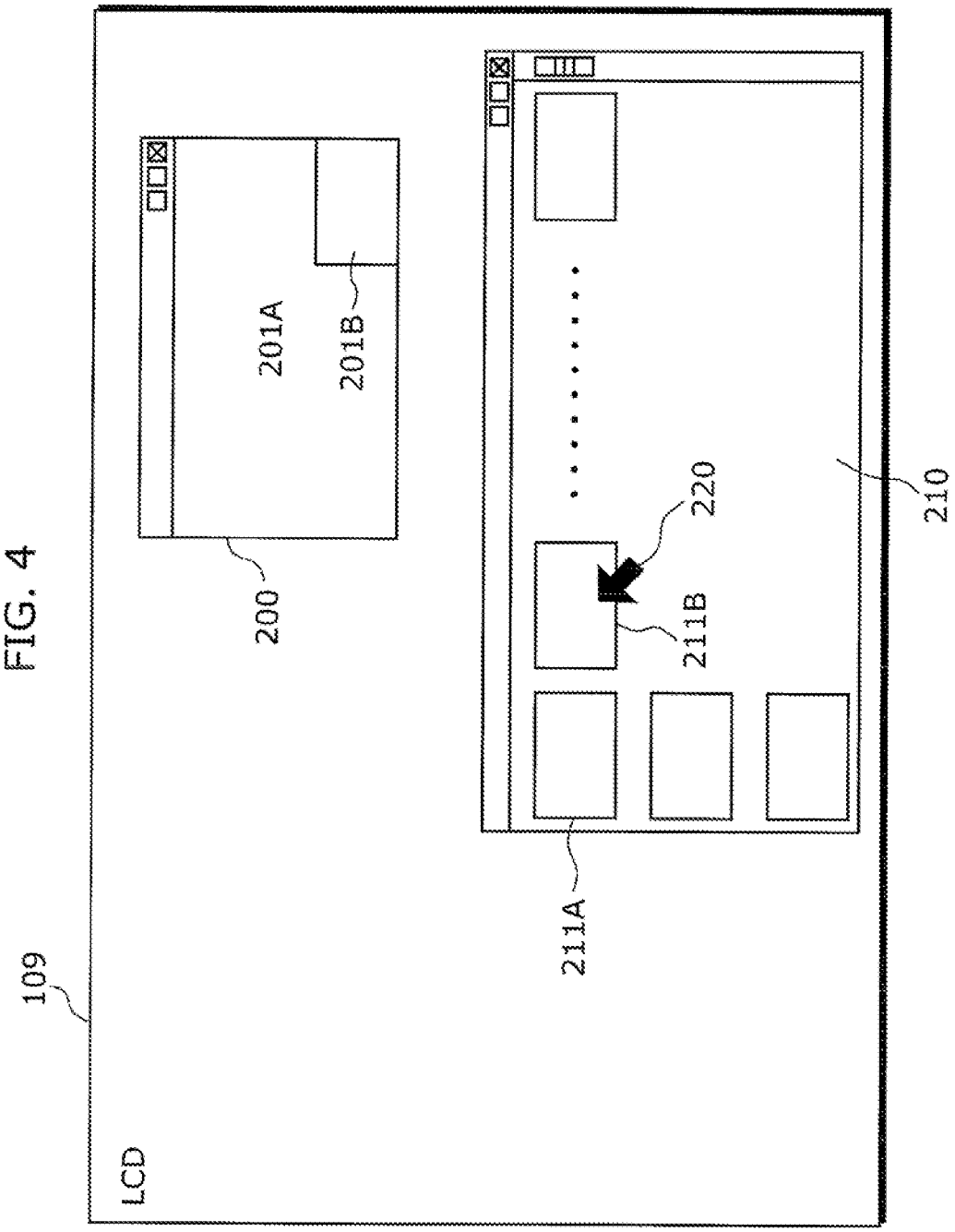
FIG. 4 schematically shows a transmission screen provided on a liquid crystal display (LCD) according to Embodiment 1.

Next a layout of a transmission screen provided on the LCD 109 shall be described with reference to FIG. 4. FIG. 4 schematically shows the transmission screen provided on the LCD 109 according to Embodiment 1.

As shown in FIG. 4, the transmission screen provided on the LCD 109 includes a window 200 for a communications service, and a window 210 which has a folder storing moving image data.

The user refers to the window 200 for a communications service when the user displays or transmits (i) the real-time images obtained by the movie camera 120 which connects to the PC 100, and (ii) the moving image data stored in the HDD 104. Here the window 200 for a communications service includes child screens 201A and 2018.

The child screens 201A and 201B displays real-time images and moving image data. When the user is on the communications service, for example, the child screen 201A may display real-time images obtained by a movie camera connected to another PC, and the child screen 2016 may display real-time images obtained by the movie camera 120 connected to the PC 100. The child screen 201A may display real-time images obtained by a movie camera connected to another PC, and the child screen 201B may display the moving image data stored in the HDD 104.

The window 210 which has a folder storing moving image data displays moving image data to be transmitted. As shown in FIG. 4, the window 210 which has a folder storing moving image data displays two or more pieces of moving image data, such as moving image data 211A and moving image data 2118. The moving image data, displayed on the window 210 which has a folder storing moving image data, may represent all the moving image data stored in the HDD 104, or may represent selectively extracted moving image data stored in a specific folder.

With the mouse 105, the user can select the moving image data displayed on the window 210 which has a folder storing moving image data. Here the user operates the mouse 105 to move a mouth cursor 220 shown on the transmission screen on desired moving image data, and to click the mouse 105, so that the user can select the desired moving image data. The user diagonally moves the mouse cursor 220 across the area surrounding two or more pieces of desired moving image data, so that the user can select the area having the desired moving image data.

Described next is a brief overview of a transmission operation by the user on the transmission screen.

The user uses the mouse 105 to select moving image data (the moving image data 211A, for example) found on the window 210 which has a folder storing moving image data, and to drag and drop the selected picture data. Then the first arithmetic processing unit 101 processes the dragged-and-dropped moving image data, and transmits the processed moving image data via the transmitter module 110. Described hereinafter is how the first arithmetic processing unit 101 processes the moving image data 211A selected by the user.

4. System Operation

Figure 5:
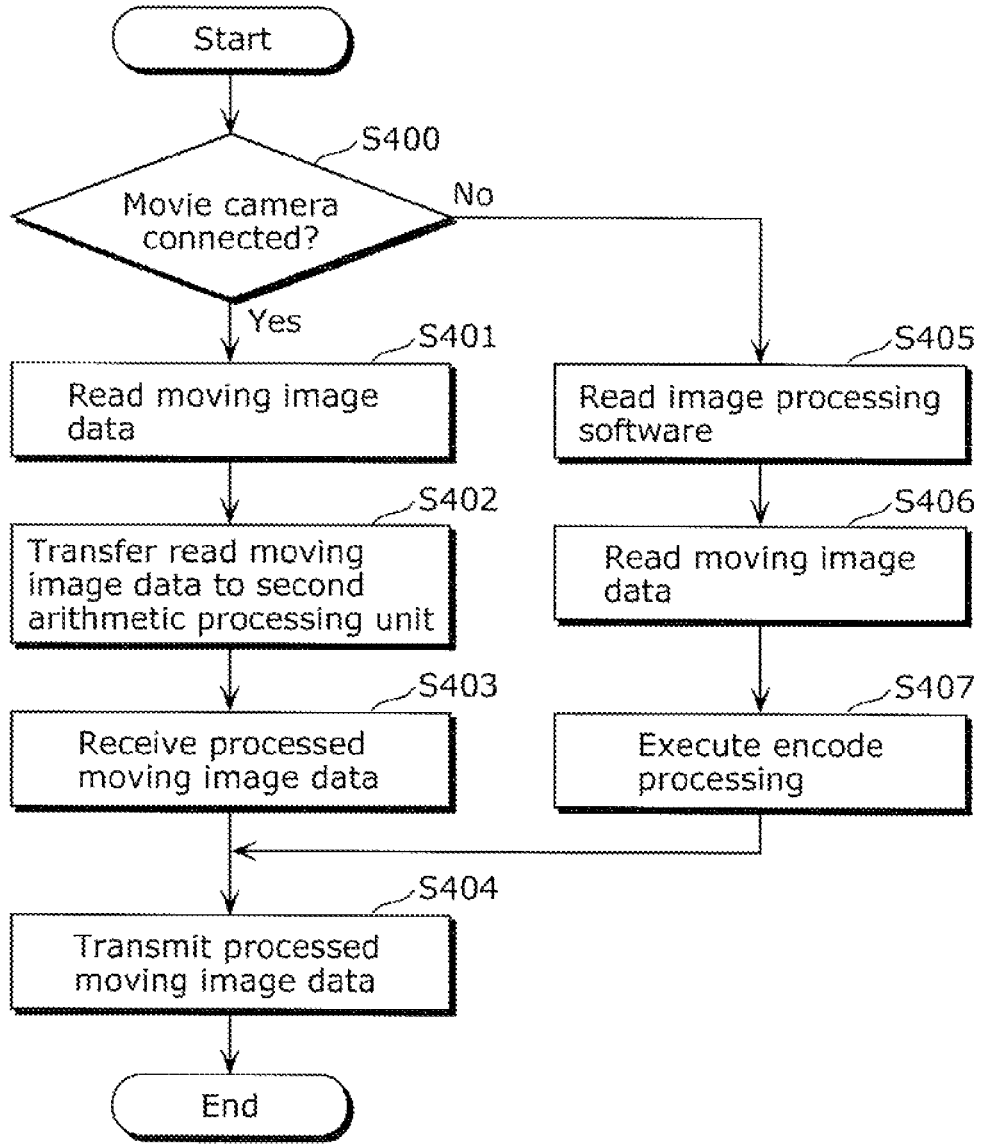
FIG. 5 is a flowchart showing a processing operation on a first arithmetic processing unit once a transmission operation according to Embodiment 1 starts.

Described next is a process executed on the first arithmetic processing unit 101 in accordance with the user's transmission operation, with reference to FIG. 5. FIG. 5 is a flowchart showing a processing operation on the first arithmetic processing unit 101 once a transmission operation according to Embodiment 1 starts.

When the user selects moving image data to be transmitted to another PC, the first arithmetic processing unit 101 determines whether or not the movie camera 120 including the second arithmetic processing unit 122 is connected to the PC 100 via the USB connector 107 (S400).

In the case where the movie camera 120 including the second arithmetic processing unit 122 is connected to the first arithmetic processing unit 101 (S400: Yes), the first arithmetic processing unit 101 proceeds to Step S401. In the case where the movie camera 120 is not connected to the PC 100 (S400: No), the first arithmetic processing unit 101 proceeds to Step S405.

First, the case of Step S401 where the movie camera 120 is connected is described. The first arithmetic processing unit 101 reads the moving image data 211A stored in the HDD 104 (S401).

Then the first arithmetic processing unit 101 transfers the read moving image data 211A to the second arithmetic processing unit 122 via the USB connector 107 (S402). Upon receiving the moving image data 211A, the second arithmetic processing unit 122 uses a dedicated image processing circuit to encode the moving image data 211A via hardware.

When the second arithmetic processing unit 122 finishes the encoding processing, the first arithmetic processing unit 101 receives the processed moving image data (S403).

Upon receiving the processed moving image data, the first arithmetic processing unit 101 transmits the data to the other PC via the transmitter module 110 (S404).

Next, described is the case of Step S405 where the movie camera 120 is not connected. First, the first arithmetic processing unit 101 reads the image processing software stored in the HDD 104 (S405).

The first arithmetic processing unit 101 reads the moving image data 211A stored in the HDD 104 (S406).

Then the first arithmetic processing unit 101 uses the image processing software read in Step S405 to encode the moving image data 211A (S407).

Upon finishing the encoding processing, the first arithmetic processing unit 101 transmits the processed moving image data to the other PC via the transmitter module 110 (S404).

Embodiment 1 shows the case where the user selects the moving image data 211A alone; concurrently, the present invention can be applicable to the case where the user selects two or more pieces of moving image data. In other words, the first arithmetic processing unit 101 can execute the above processing on each of the pieces of moving image data that the user has selected. The first arithmetic processing unit 101 may either execute in parallel the processing on the pieces of moving image data or sequentially execute the processing on the pieces of the moving image data one by one.

Now, described hereinafter is the case where the movie camera 120 is connected to the PC 100, and then disconnected after the transmission processing starts in Step S401 and before the transmission processing ends.

Upon confirming the disconnection of the movie camera 120, the first arithmetic processing unit 101 suspends the transmission processing, and switches the processing flow to resume at Step S405. The above operation allows the first arithmetic processing unit 101 to continue the transmission processing even though the movie camera 120 is disconnected while transmission processing.

5. Summary

As described above, the PC 100 according to Embodiment is an electronic device connectible to the movie camera 120. The PC 100 includes: the reading unit 131 which read image data; the transmitting unit 132 which transmits the image data read by reading unit 131 to another electronic device via the telecommunications line 150 upon receiving a user operation; the first image processing unit 133 which processes the image data read by the reading unit 131, and the control unit 134 which (i) causes, in the case where the second image processing unit 141 has a connection to the control unit 134, the second image processing unit 141 to process the image data, and the transmitting unit 132 to transmit the processed image data, and (ii) causes, in the case where the second image processing unit 141 does not have a connection to the control unit 134, the first image processing unit 133 to process the image data, and the transmitting unit 132 to transmit the processed image data. Here the second image processing unit 141 is included in the movie camera 120 and processes, as well as the image, image data which is obtained by the movie camera 120.

When the second image processing unit 141 included in the movie camera 120 has a connection to the control unit 134, the PC 100 causes the second image processing unit 141 to process the moving image data to be transmitted. When the second image processing unit 141 does not have a connection to the control unit 134, the PC 100 causes the first image processing unit 133 to process the moving image. Here, in a video conference, the PC 100 is used with the movie camera 120 connected. Thus the second image processing unit 141 in the movie camera 120 has a connection to the control unit 134 in the PC 100. This structure causes the second image processing unit 141 to process the image, which contributes to reducing a processing load on the first image processing unit 133.

When, in the PC 100, the transmitting unit 132 does not transmit the image data read by the reading unit 131, the control unit 134 causes the transmitting unit 132 to transmit the image data which is obtained by the movie camera 120 and processed by the second image processing unit 141.

In the above structure, when the transmitting unit 132 does not transmit the moving image data read by the reading unit 131, the PC 100 causes the transmitting unit 132 to transmit the moving image data obtained by the movie camera 120 and processed by the second image processing unit 141. This structure allows smooth transmission of the moving image data obtained by the movie camera 120 and the moving image data read by the reading unit 131.

In the case where the second image processing unit 141 processes the moving image data read by the reading unit 131 in the electronic device system 10, the second image processing unit 141 processes the image data. In the case where the second image processing unit 141 does not process the moving image data read by the reading unit 131, the second image processing unit 141 processes moving image data obtained by the imaging unit 121. In other words, the single second image processing unit 141 can process both of the moving image data read by the reading unit 131 and the moving image data obtained by the imaging unit 121. This structure contributes to reducing a processing load on the first image processing unit 133.

6. Another Embodiment

The PC 100 according to an implementation of the present invention has been described in the above Embodiment 1; concurrently, the present invention may be implemented in another embodiment instead of in Embodiment 1.

Although only exemplary embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention. Described hereinafter is another embodiment in the present invention.

In Embodiment 1, the moving image data is stored in the HDD 104. The stored moving image data is processed and transmitted. Here the data to be stored in the HDD 104, processed, and transmitted shall not be limited to moving image data; concurrently, the data may be image data including a still image.

In Embodiment 1, the video conference system is exemplified as a system to exchange communications with another electronic device via a telecommunications line; concurrently, the present invention shall not be limited to such a video conference system. Any as communications system via a telecommunications line, such as a videophone system, may be applicable to the present invention.

In Embodiment 1, the HDD 104 is included in the PC 100 as an example; concurrently, the present invention shall not be limited to the structure. The HDD 104 may be externally attached to the PC 100 in the present invention. Any storage medium other than the HDD 104 may be applicable to the present invention as far as the storage medium can store image data such as moving image data.

In Embodiment 1, the encoding processing is exemplified as image processing; concurrently, the present invention shall not be limited to the encoding processing. For example, an image processing such as bit rate changing and resizing may also be applicable to the present invention.

The PC 100 according to Embodiment 1 processes the moving image data using a single movie camera 120; concurrently, the present invention shall not be limited to this structure. When two or more movie cameras connect to the PC 100 to transmit pieces of moving image data, for example, the first arithmetic processing unit 101 may cause each of the movie cameras to encode their moving image data in parallel.

Considering the time period of each piece of moving image data selected by the user for transmission, the first arithmetic processing unit 101 may organize the order of the pieces of moving image data to be allocated to a movie camera.

The PC 100 according to Embodiment 1 sequentially encodes and transmits a piece of moving image data which the user desires to transmit; concurrently, the PC 100 may encode and transmit the piece of the moving image data in parallel.

Figure 6:
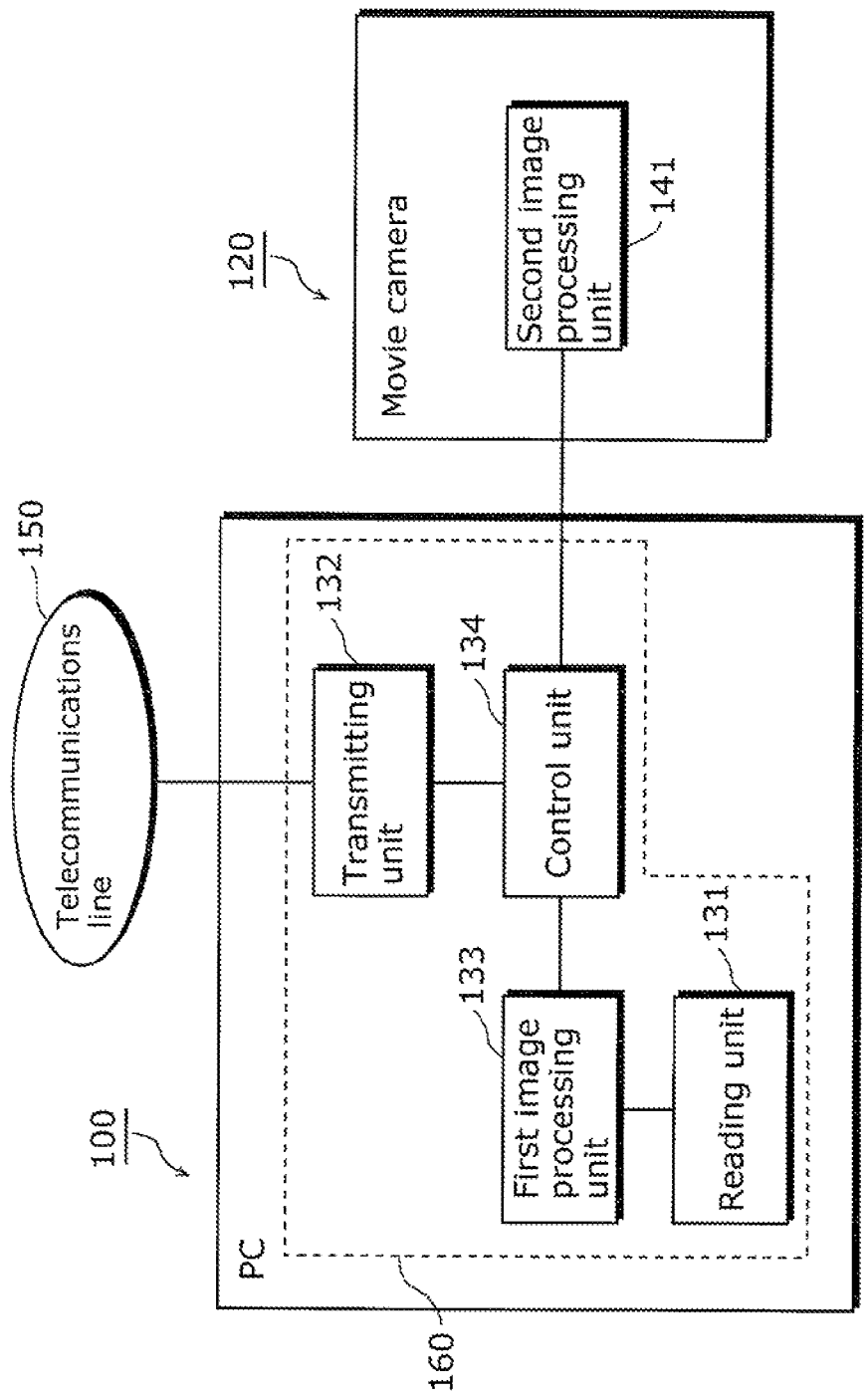
FIG. 6 is a block diagram showing an integrated circuit according to another Embodiment other than the Embodiment 1.

Instead of being introduced as the PC 100, the present invention may also be introduced as (i) the electronic device system 10 including the PC 100 and the movie camera 120, (ii) a method which involves executing processes carried out by the processing units included in the PC 100 as steps, and (iii) a program product which, when loaded into a computer, causes the computer to execute the distinctive processes included in the method. As a matter of course, such a program product may be distributed via storage media including a CD-ROM, and transmission media including the Internet. The present invention may also be provided as an integrated circuit including the distinctive processing units included in the PC 100. Each of the units may be formed in a single chip. Some or all of the units are formed in a single chip. As shown in FIG. 6, for example, the present invention may be provided as an integrated circuit 160 including the transmitting unit 132, the first image processing unit 133, and the control unit 134.

It is noted that the integrated circuit 160 can be introduced in a form of: an integrated circuit (IC), a system Large Scale Integrated circuit (LSI), a super LSI, and an ultra LSI. In addition, the following may be employed for an implementation of the present invention: the Field Programmable Gate Array (FPGA) which is programmable after building the LSI, and the reconfigurable processor which allows a circuit cell in the LSI to be reconnected and reconfigured.

In the case where the advancement of the semiconductor technology or another derivative technology thereof introduces and a new circuit integrating technique which will replace the LSI, the new technology may be employed as a matter of course to integrate the functional blocks. The optical technology and the biotechnology can be applied to the integration.

INDUSTRIAL APPLICABILITY

The present invention relates to electronic devices and, more particularly, to an electronic device which can connect to an imaging device, and can process and transmit image data. In addition to the application to the PC 100, the present invention is also applicable to an electronic device, such as a cellular phone, as far as the electronic device is connectible to an imaging device and is capable of processing image data and the transmitting the processed image data. Furthermore, the present invention may be applicable to a CD or a Digital Versatile Disc (DVD) storing a program product which is executable a similar function as the electronic device.

What is claimed is:

1. An electronic device which is connectible to an imaging device, said electronic device comprising:
a reading unit configured to read image data;
a transmitting unit configured to transmit the image data read by said reading unit to another electronic device via a telecommunications line upon receiving a user operation;
a first image processing unit configured to process the image data read by said reading unit; and
a control unit configured to cause, in a case where a second image processing unit has a connection to said control unit, said second image processing unit to process the image data read by said reading unit, and said transmitting unit to transmit the processed image data, and cause, in a case where said second image processing unit does not have a connection to said control unit, said first image processing unit to process the image data read by said reading unit, and said transmitting unit to transmit the processed image data, said second image processing unit being included in the imaging device and processing, as well as the image data read by said reading unit, image data which is obtained by the imaging device.

2. The electronic device according to claim 1,
wherein when said transmitting unit does not transmit the image data read by said reading unit, said control unit is configured to cause said transmitting unit to transmit the image data which is obtained by the imaging device and processed by said second image processing unit.

3. An electronic device system comprising:
said electronic device according to claim 1; and
the imaging device connected to said electronic device.

4. The electronic device system according to claim 3,
wherein the imaging device further includes an imaging unit configured to capture an object, and
said second image processing unit is (i) configured, when said second image processing unit processes the image data read by said reading unit, to transmit the processed image data to said control unit, and (ii) configured, when said second image processing unit does not process the image data read by said reading unit, to process image data of the object captured by said imaging unit, and to transmit the processed image data to said control unit.

5. An image processing method executed on an electronic device which is connectible to an imaging device,
wherein the electronic device includes:
a reading unit which reads image data;
a transmitting unit which transmits the image data read by the reading unit to another electronic device via a telecommunications line upon receiving a user operation; and
a first image processing unit which processes the image data read by the reading unit, and said image processing method comprises:
in a case where a second image processing unit has a connection to a control unit of the electronic device, causing the second image processing unit to process the image data read by the reading unit, and causing the transmitting unit to transmit the processed image data, the second image processing unit being included in the imaging device and processing, as well as the image data read by the reading unit, image data which is obtained by the imaging device; and
in a case where the second image processing unit does not have a connection to the control unit of the electronic device, causing the first image processing unit to process the image data read by the reading unit, and causing the transmitting unit to transmit the processed image data.

6. A program product which is stored on a non-transitory computer-readable recording medium and causes a computer to execute said image processing method according to claim 5.

7. An integrated circuit which is connectible to an imaging device, said integrated circuit comprising:
a reading unit configured to read image data;
a transmitting unit configured to transmit the image data read by said reading unit to another electronic device via a telecommunications line upon receiving a user operation;
a first image processing unit configured to process the image data read by said reading unit; and
a control unit configured to cause, in a case where a second image processing unit has a connection to said control unit, said second image processing unit to process the image data read by said reading unit, and said transmitting unit to transmit the processed image data, and cause, in a case where said second image processing unit does not have a connection to said control unit, said first image processing unit to process the image data read by said reading unit, and said transmitting unit to transmit the processed image data, said second image processing unit being included in the imaging device and processing, as well as the image data read by said reading unit, image data which is obtained by the imaging device.

* * * * *